United States Patent [19]
Kocher et al.

[11] Patent Number: 6,138,435
[45] Date of Patent: Oct. 31, 2000

[54] PROFILE SECTIONS FOR PLATE-LIKE COMPOSITE ELEMENTS

[75] Inventors: Laurent Kocher, Wohlen; Peter Rysavy, Zürich; Markus Spieler, Hünenberg, all of Switzerland

[73] Assignee: Alusuisse Airex AG, Sins, Switzerland

[21] Appl. No.: 09/029,221

[22] PCT Filed: Aug. 22, 1996

[86] PCT No.: PCT/EP96/03703

§ 371 Date: Jul. 22, 1998

§ 102(e) Date: Jul. 22, 1998

[87] PCT Pub. No.: WO97/08034

PCT Pub. Date: Mar. 6, 1997

[30] Foreign Application Priority Data

Aug. 25, 1995 [DE] Germany ............ 195 31 349

[51] Int. Cl.[7] ................................. E04C 2/38
[52] U.S. Cl. ............... 52/800.1; 52/800.11; 52/800.12; 52/730.1; 52/730.6; 52/731.7; 52/797.1
[58] Field of Search ............... D25/122; 52/800.12, 52/800.1, 800.11, 802.1, 797.1, 730.1, 730.4, 730.6, 731.2, 731.7

[56] References Cited

U.S. PATENT DOCUMENTS

| | | | |
|---|---|---|---|
| D. 213,613 | 3/1969 | Lautem et al. | D25/122 |
| D. 253,552 | 11/1979 | Durbin | D25/122 |
| 3,121,264 | 2/1964 | Hammar | 52/802.1 |
| 3,357,146 | 12/1967 | Gartrell | 52/802.1 |
| 3,383,801 | 5/1968 | Dallaire | 52/802.1 |
| 5,050,363 | 9/1991 | Fornell | 52/730.4 |
| 5,577,363 | 11/1996 | Tate et al. | 52/802.1 |

Primary Examiner—Beth A. Stephan
Assistant Examiner—Dennis L. Dorsey
Attorney, Agent, or Firm—Fisher, Christen & Sabol

[57] ABSTRACT

The invention concerns profile sections for reinforcing or finishing the edges of plate-like composite elements, said sections comprising a core layer (31) and two cover layers (11, 21). The invention further concerns composite elements produced thereby and a method of producing these composite elements. The profile sections consist of at least two parallel legs (1, 2) and a connection web (4) and comprise an abutment surface (3) for the core layer (31). Disposed between the edges (5, 6) of the abutment surface (3) and the connection web (4) are open channels (7, 8) through which the air located between the cover layers (11, 21) and the core layer (31) and/or the profile section legs when the composite element is bonded can escape such that a bubble-free bonded connection is attained over the entire surface.

18 Claims, 5 Drawing Sheets

PROFILE SECTIONS FOR PLATE-LIKE COMPOSITE ELEMENTS

BACKGROUND OF THE INVENTION

1. Field of the Invention

The present invention relates to new profiles for use as reinforcement or bordering of sheetlike composite elements ("sandwich elements"), to the composite elements constructed with these profiles, and to a process for producing these composite elements.

2. Background Art

Sheetlike composite elements, consisting most simply of a core layer and two top layers connected by this core layer and surface-bonded to it, the material employed for the core layer generally being a rigid foam and the material employed for the top layers generally being sheet metal or another material having tensile strength, are increasingly used as a construction material owing to their low weight and advantageous mechanical properties. In transportation in particular, i.e. in the construction of commercial vehicles of all kinds, for example lorries, buses or rail vehicles, or of freight containers, they are employed in particular for floor, wall and ceiling constructions.

Here and in the text below the term "sheetlike" composite elements does not refer exclusively to flat components but also to curved parts, such as the roofs of rail carriages, whose form can essentially be described by cylindrical areas or by a combination of flat and cylindrical areas.

Owing to the limited stability of these composite elements in the case of locally concentrated stresses, especially as a result of forces acting in a punctiform or linear manner perpendicularly to the layers and above all in the border region, it is frequently necessary to install reinforcing elements at the appropriate points, i.e. places where fixing elements need to be attached to join the composite elements to one another, to other load-bearing structural components or to mechanically stressed fitments (e.g. seats, holding rails or luggage racks in public transport vehicles), these reinforcing elements being in the form of profiles of metal or another high-strength material.

The term border profiles is used here and below to denote those profiles which form the border of a composite element or which join two composite elements to one another at their borders (joining profiles). Insert profiles denote those profiles which for reinforcement purposes are arranged in the interior of the composite element, the core layer being interrupted at the appropriate point and the top layers running on over the profile.

Both the core layer and the top layers can be homogeneous or can be constructed in turn from a plurality of layers. For example, a reinforcing layer can be embedded in a core layer of foam, or a top layer may, for example, consist of plywood.

The composite elements are normally produced by coating one or both sides of the top layers (consisting for example of sheet aluminium), the core material and the insert or border profiles—having simple cross-sections, in general, usual square profiles—with an adhesive, initially on the boundary faces. Subsequently, the individual parts are brought together in the desired geometric arrangement in a bonding mould and surface-bonded by external pressure. The external pressure employed is frequently the atmospheric air pressure, the bonding mould being covered with an airtight film and evacuated. In order to obtain a good bond and a flawless surface, it is necessary to allow the air between the layers, and also any excess adhesive, to escape as fully as possible. To this end the core layer is often provided with a relatively large number of parallel slots or grooves through which the air is able to pass to the border of the composite element. When using customary commercial profiles, for example in U, Z or H cross-section, however, this is no longer ensured. Indeed, in order to achieve high mechanical stability these profiles must be bonded over their entire area both to the top layers and to the narrow side of the core layer, leaving no room in between for the escape of air. Consequently, the production of composite elements of large surface area in particular is often accompanied, especially in the region of the profiles, by the formation of air bubbles, which may considerably impair the mechanical properties and may also be visible on the exterior of the component.

BROAD DESCRIPTION OF THE INVENTION

The object of the present invention, therefore, was to provide new profiles which do not give rise to these disadvantageous phenomena in the production of sheetlike composite elements.

This object is achieved in accordance with the invention by the profiles according to Patent claim 1. In their simplest form, the profiles consist of two essentially parallel arms whose inside or outside serves as a bearing surface for in each case one of the top layers, of a connecting crosspiece between the arms, and of a bearing surface for the narrow side of the core layer. The geometric spacing of the arms, i.e. the distance between the planes defined by the bearing surfaces for the top layers, corresponds to the distance between the top layers of the composite elements that are to be produced with the profile; the bearing surface for the core layer lies between these planes. Depending on the relative position of the arms to one another and to the connecting crosspiece, the profile may have an essentially U-, Z- or H-shaped cross-section, although transitional variants of course are also possible.

Combinations of these basic forms are also possible by the presence of two or more connecting crosspieces between the arms. One preferred form, for example, contains two opposing bearing surfaces for the core layer and is therefore particularly suitable as an insert or joining profile.

The core-layer bearing surface, which is preferably perpendicular to the arms of the profile, is in accordance with the invention not—as with a simple U, Z or H profile—directly adjacent to these arms but instead is separated from the connecting crosspiece by at least one spacer which extends in the longitudinal direction of the profile. In this arrangement, the spacer (or, in the case of a plurality of spacers, each outer spacer) does not adjoin an outer border of the core-layer bearing surface but is set back from it, thus forming a channel which extends in the longitudinal direction of the profile. The core-layer bearing surface is designed, furthermore, so that between its outer (longitudinal) borders and the bearing surfaces for the top layers, and between the planes defined by these surfaces, there remains in each case an interspace extending in the longitudinal direction of the profile. The interspaces are preferably continuous over the entire length of the profile but may also be interrupted at short sections as a result, for example, of the corresponding design of the borders. As a result of this, the bearing surface for the core layer does not with its borders form an airtight seal to the top layers in the installed state; instead, there remains in each case a continuous or interrupted gap which communicates with at least one of the above-described channels extending in the longitudinal direction of the profile. The profile preferably contains a corresponding channel for each gap, it being possible for the profile also to include, if desired, additional, open or closed channels. This system of gaps and channels enables both air and excess adhesive to escape without problems during the manufacture of the composite elements. Because of the offset of each spacer the channels have a sufficiently large cross-section which even in long profiles allows rapid escape of air and which cannot be blocked by, for instance, the ingress of excess adhesive. Especially in the case of vacuum bonding, this achieves improved evacuation of the interior of the component, which also enhances the strength of the adhesive surface bonds between core layer and top layers.

The bearing surfaces for the top layers and/or the core layer are preferably provided with slots or grooves. When the composite elements are bonded, these slots or grooves are able to accommodate some of the adhesive, and possibly also material of the top layer if the latter is readily deformable. This produces a certain intermeshing effect or a positive connection, which increases the strength of the adhesive bond. For mechanical and manufacturing reasons, these slots or grooves preferably extend in the longitudinal direction of the profile.

In one particularly preferred design the bearing surfaces for the top layers are on the sides of the arms that are remote from the connecting crosspiece, i.e. on the outsides of the profile. In the installed state they contact the top layers of the composite element from inside, the distance between the bearing surfaces corresponding to the thickness of the core layer. Profiles of this design are suitable both as insert profiles in the interior of the composite element and as border profiles.

In another preferred design the bearing surfaces for the top layers are on the sides of the arms that face the connecting crosspiece, i.e. on the insides of the profile. In the installed state they contact the top layers of the composite element from outside, the distance between the bearing surfaces corresponding to the overall thickness of the composite element. Profiles of this design are suitable as border profiles (with U- or H-shaped cross-section) or as joining profiles for two composite elements (with H-shaped cross-section).

In a further design, the bearing surface for one top layer is on the side of one arm that faces the connecting crosspiece and the bearing surface for the other top layer is on that side of the other arm that is remote from the connecting crosspiece. In the installed state, therefore, one top layer is contacted from outside and the other from inside. The distance between the bearing surfaces corresponds to the thickness of the core layer plus one top layer. Profiles of this design are suitable as border profiles, especially if the composite element is to be mounted by one side on a support frame and is to form a smooth surface on the other side. The composite element can then be fastened directly to the border profile.

To facilitate the assembly of the finished composite element and/or to improve its mechanical properties it is possible to provide border profiles according to the invention, outside the bearing surfaces for the core and top layers, with spacing and/or bearing elements, for example with formed-on spacer strips. It is likewise possible to provide holding elements which are suitable for receiving the spacing and/or bearing elements. The latter can then, for example, consist of a different material from the profile itself.

For this purpose, in one particularly preferred embodiment grooves extending in the longitudinal direction are made in the profiles, into which grooves, for example, it is possible to insert spacer strips of elastic material or—given appropriate groove cross-section—fastening nuts.

The profiles, furthermore, may also include additional channels for the laying of lines of all kinds, these channels possibly also serving themselves as lines for air or a heating medium, for example.

Examples of suitable materials for the profiles are metals, especially steel or aluminium (alloys) or else solid plastics. They can be produced by techniques customary for the material, for example by the bending or rolling of metal sheets, by milling from solid material or by the compression-moulding or extrusion of materials capable of plastic deformation. Preferably they are produced by extrusion of aluminium alloys. This technique is particularly suitable for producing complex profile cross-sections in one operation without additional machining.

A further subject of the invention are the sheetlike composite elements consisting of at least one core layer, two top layers connected to it at the surface, and at least one profile according to the invention. Materials suitable for the core layer are in principle all materials customary in this technical field, especially closed-cell rigid foams, for example those based on polyvinyl chloride, polyolefins or polyurethanes. Also suitable are natural lightweight construction materials, such as cork or balsa wood, for example, or inorganic materials, such as foam glass, for example. Examples of suitable top layers are metal sheets, especially those of steel alloys or aluminium alloys, plastic films or sheets, especially with fibre reinforcement, and also materials such as kraft paper, chipboard or plywood. The surface connection between core and top layers is preferably an adhesive bond, although depending on the combination of materials other types of connection may be suitable, for example a welded bond.

The core layer is preferably provided on at least one of the surfaces which are bonded to the top layers, with a system of slots or grooves that are essentially parallel to one another. They are preferably arranged so that they form an angle with the longitudinal direction of the profile or profiles.

In one preferred embodiment of the composite elements the latter comprise a border profile according to the invention, and at least one of the top layers is bent as a border finish around a correspondingly designed edge of the border profile, preferably by an angle of from about 90° to about 180°. This both improves the tensile strength of the connection of the top layer to the profile and makes for a visually appealing border, and on the installed composite element the profile is out of sight.

The composite elements are produced in accordance with the invention by providing the top layers and/or the prefabricated core layer on at least one side of the intended contact surfaces with an adhesive, bringing together the said layer or layers in the intended arrangement with one another and with the profile (5), which may also have been coated with adhesive, and bonding the components to one another by means of external pressure. The entire arrangement can, if desired, be heated in order to activate and/or bring about faster curing of the adhesive.

In order to avoid inclusions of air in the course of bonding, and to interact with the channels that in accordance with the invention are present in the profiles, it is advantageous to use a core layer which is provided, on one or both of its surfaces to be bonded to the top layers, with a system of slots or grooves essentially parallel to one another. The direction of these slots or grooves judiciously forms an angle with the longitudinal direction of the profile or profiles, this angle preferably being approximately a right angle.

The external pressure employed in bonding is preferably the atmospheric air pressure, the air being removed by suction from the interspaces between the layers and so a (partial) vacuum is generated.

This procedure is preferably realized such that the prepared components of the composite element are arranged on a solid substrate and covered with a flexible airtight film. Then the space containing the composite element, enclosed by the substrate and the film, is evacuated, so that the air escapes from the interspaces through the channels of the profile or profiles, and the external air pressure compresses the entire arrangement.

To produce non-planar composite elements such as curved vehicle roofs, for example, it is advantageous to use an appropriately shaped substrate.

In order to achieve a tidy border finish and increased strength, at least one of the top layers is preferably dimensioned so that after bonding it projects over one outer edge of a border profile. The projecting portion is then bent around this edge, preferably by an angle of from about 90° to about 180°.

The profiles according to the invention have been used to produce, for example, composite elements measuring 2.2× 12.5 m². Relative to the composite elements of the same dimensions produced with conventional profiles, the former elements had considerably better mechanical properties, as could be demonstrated, inter alia, by means of peel tests.

DETAILED DESCRIPTION OF THE DRAWINGS

The drawings depict, diagrammatically, some exemplary embodiments of the profiles according to the invention and of the composite elements produced therewith; specifically.

BRIEF DESCRIPTION OF THE INVENTION

Figure 1:
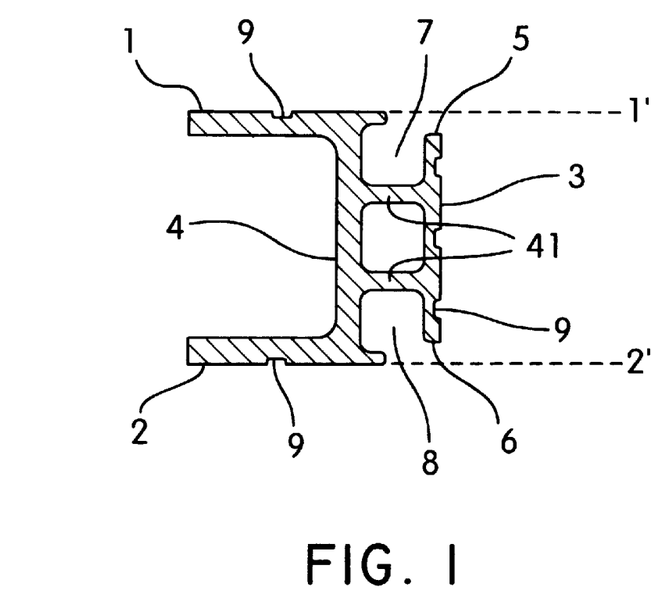
FIG. 1 shows a cross-section through a U-shaped border profile

FIG. 1 shows the cross-section through an essentially U-shaped border profile having two arms 1, 2 whose outsides serve as bearing surfaces for the top layers and define the planes 1', 2', having a bearing surface 3 with borders 5, 6 for the core layer, having a connecting crosspiece 4, two spacers 41, two open channels 7, 8, and slots 9 made in the bearing surfaces.

Figure 2:
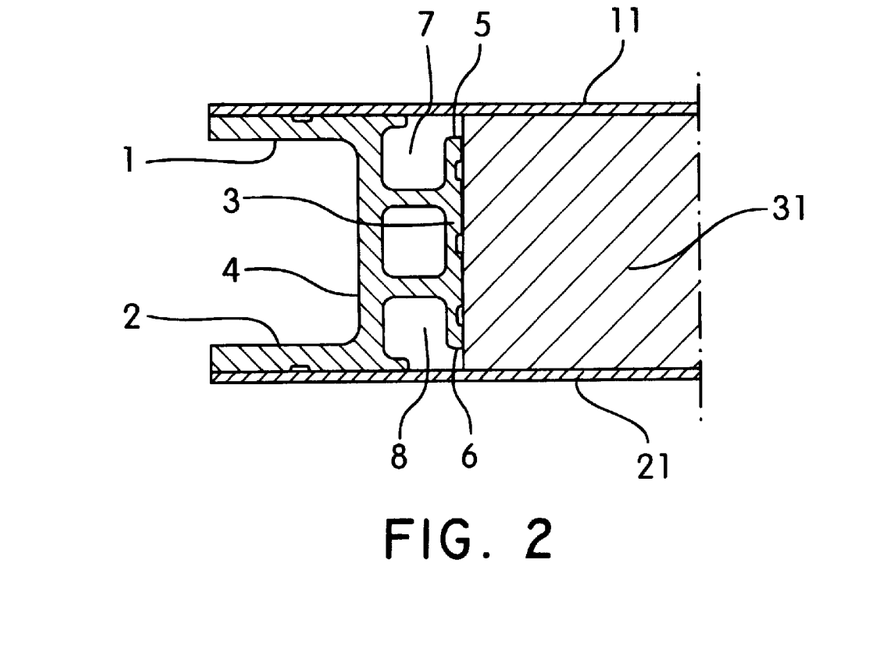
FIG. 2 shows a cross-section through the border part of a composite element fitted with a U-shaped border profile

FIG. 2 shows the same border profile as FIG. 1, but in the installed state with the top layers 11, 21 and the core layer 31. At the open channels 7, 8 it is possible to see the interspaces between the top layers 11, 21 and the borders 5, 6 of the bearing surface 3 for the core layer 31.

Figure 3:
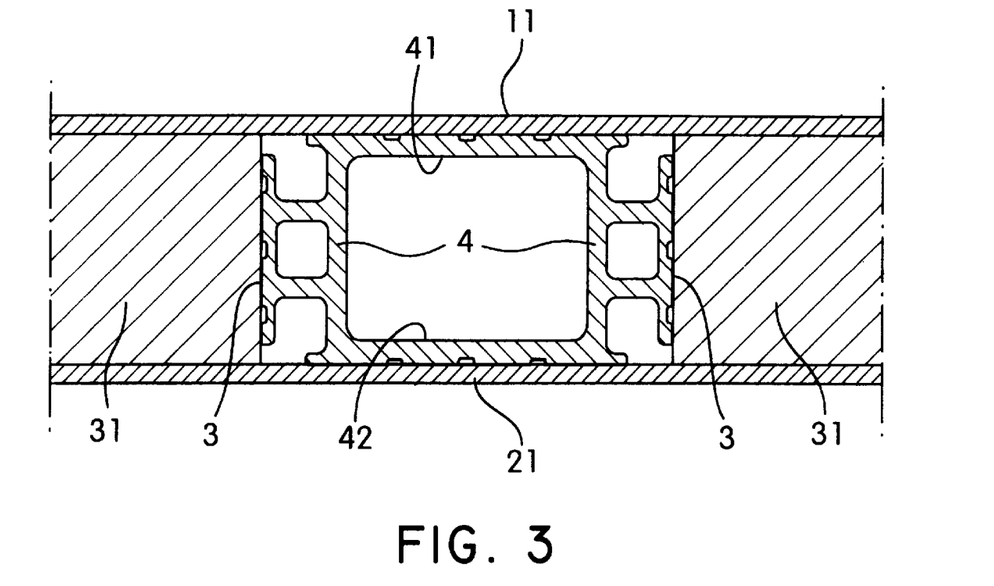
FIG. 3 shows a cross-section through a composite element with insert profile

FIG. 3 shows, in cross-section, an insert profile in the installed state. The profile has two opposing bearing surfaces 3 for in each case one core layer 31 and is covered over by the top layers 11, 21, so that in a plan view onto the composite element it is out of sight. The profile corresponds to a mirror-image doubling of the profile in FIG. 1.

Figure 4:
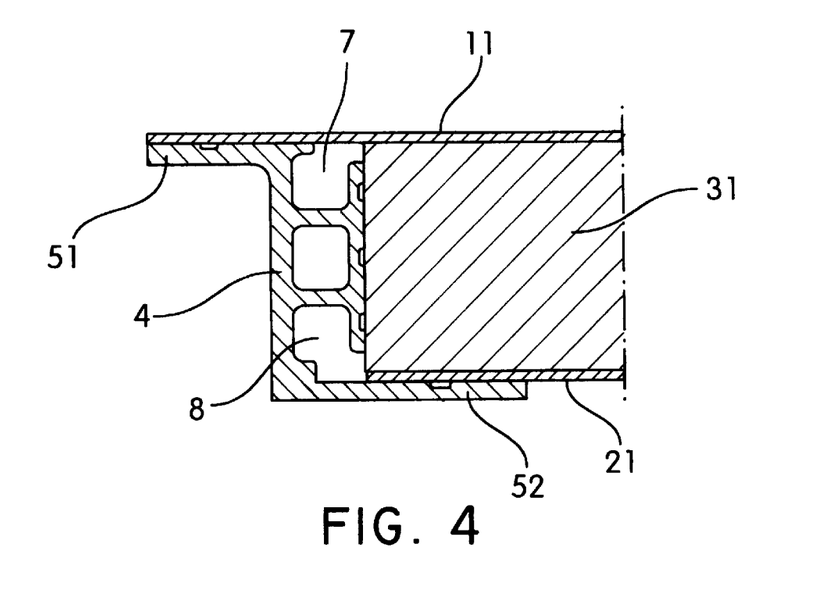
FIG. 4 shows a cross-section through the edge part of a composite element with a Z-shaped border profile

FIG. 4 shows a cross-sectionally Z-shaped border profile in the installed state. The bearing surface of the arm 41 for the top layer 11 is on the side remote from the connection crosspiece 4, while that of the arm 42 for the top layer 21 is on the side facing the connecting crosspiece. In the regions between the arms 41, 42 and the core layer 31, the open channels 7, 8 are shown. With the free surfaces of the arms 41, 42 and of the connecting crosspiece 4, the composite element is able to lie, for example, on other structural components without exerting stress on the top layers 11, 21. One top layer, 11, finishes with the outer edge of the arm 41, the other top layer, 21, finishing flush with the core layer 31.

Figure 5:
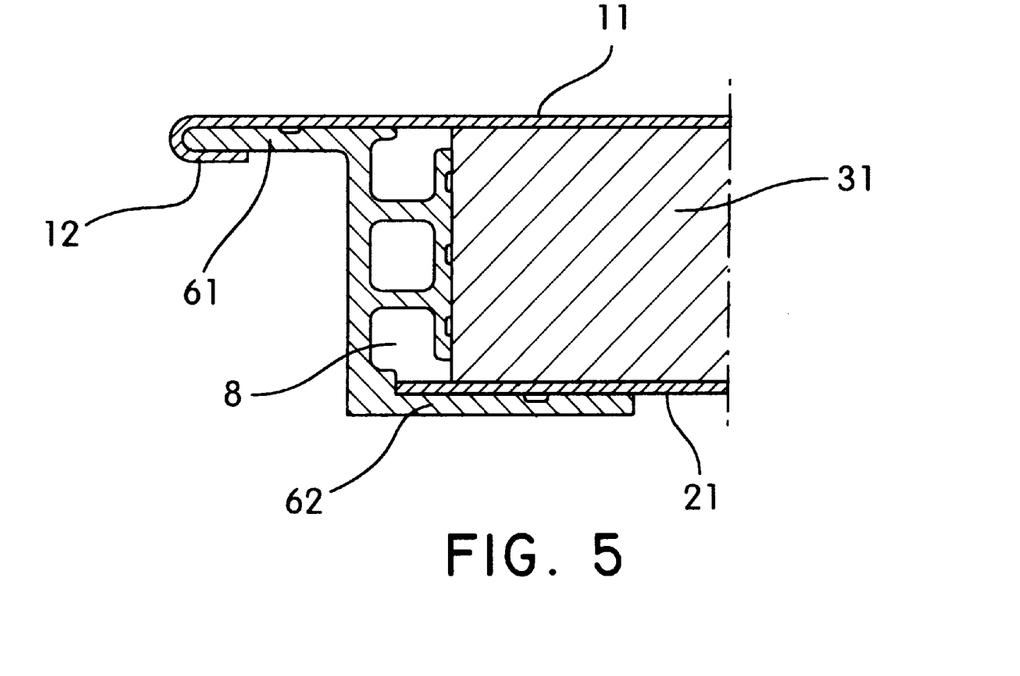
FIG. 5 shows a cross-section through the border part of a composite element with a top layer bent around the outer edge of the border profile

FIG. 5 shows in principle the same arrangement as FIG. 4, except that one top layer, 11, is bent with its border 12 by about 180° around the outer edge of the arm 51, and the other top layer, 21, continues up to a shoulder in the region of the channel 8.

Figure 6:
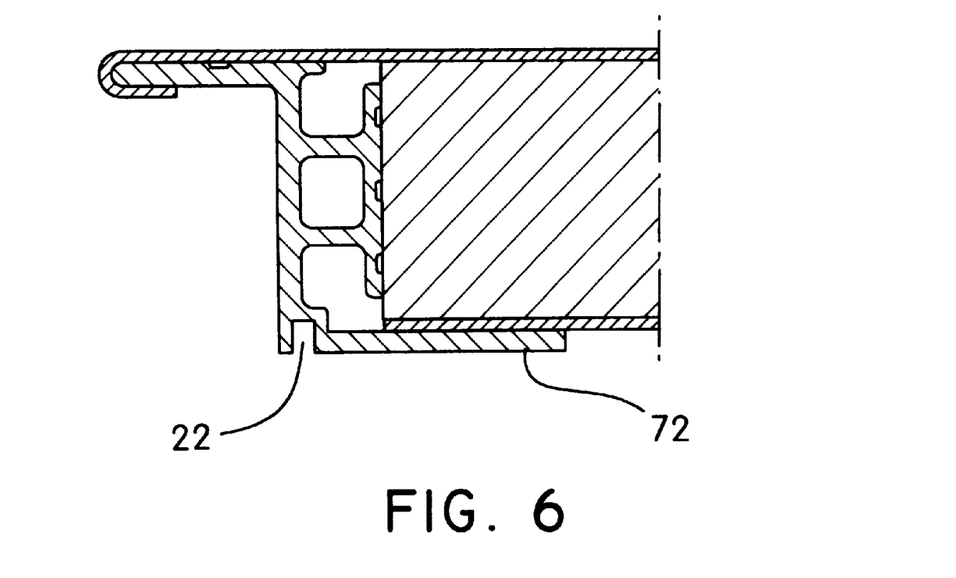
FIG. 6 shows a cross-section through the border part of a composite element with a fastening groove made in the border profile

FIG. 6 shows a similar arrangement as FIG. 5, although additionally a groove 22 is made in the free surface of the arm 62, it being possible to insert, for example, an elastic seal into this groove.

Figure 7:
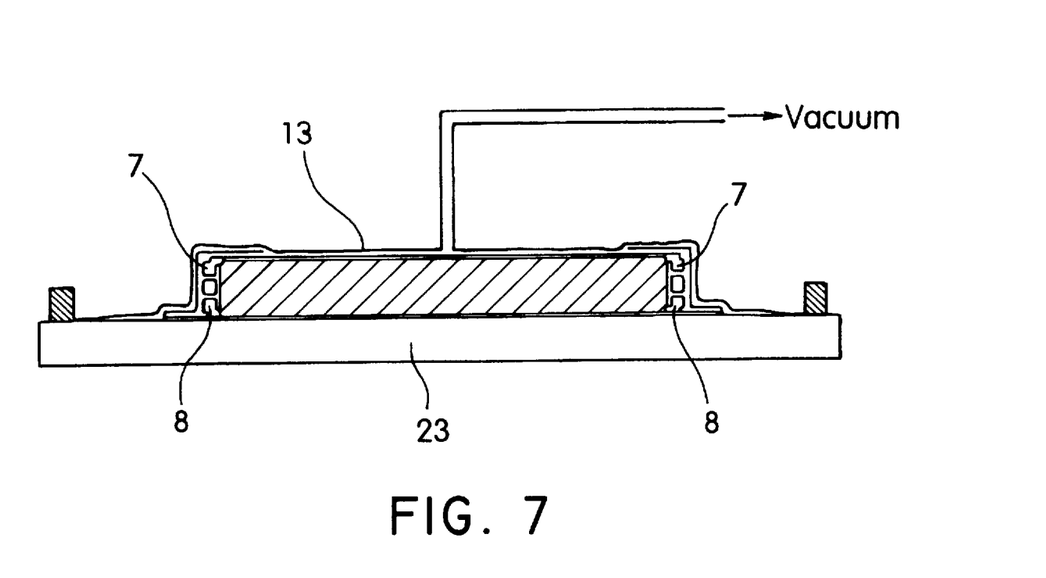
FIG. 7 shows a cross-section through the arrangement for bonding the components of a composite element

FIG. 7 shows diagrammatically the adhesive bonding of core layer, top layer and border profiles as in FIG. 4 to form a composite element. The individual parts are arranged on a solid substrate 23 and covered with a flexible airtight film 13. The space between substrate and film is evacuated so that the external air pressure compresses the arrangement and the air present between the individual parts is able to escape through the channels 7, 8.

Figure 8:
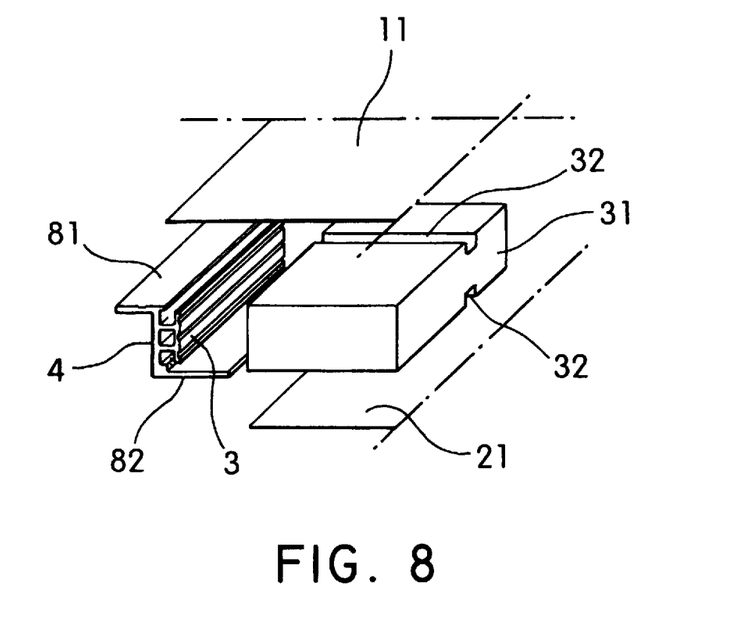
FIG. 8 shows a perspective diagram of the components of a composite element.

FIG. 8 shows in perspective the individual parts of a composite element, namely a border profile as in FIG. 4 with the two arms 81, 82 and the bearing surface 3 for the core layer, the top layers 11, 21 and the core layer 31. Slots 32 are made on the top and bottom side of the core layer 31, only one of each of these slots being shown in the diagram. The slots 32 extend approximately at right angles to the longitudinal direction of the border profile.

Figure 9:
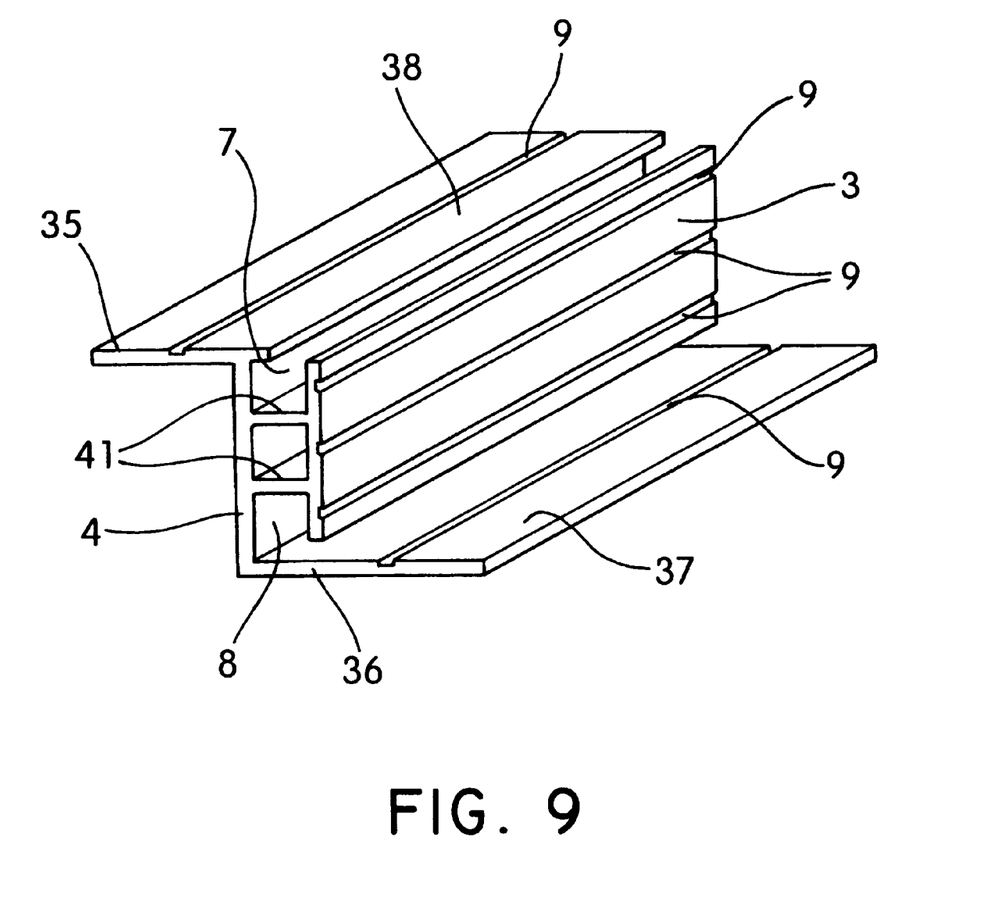
FIG. 9 shows a perspective diagram of the components of another composite.

In FIG. 9, the following reference characters (see FIG. 4) are:

3 bearing surface for the core layers
4 connecting crosspiece
7,8 open channel
9 slot
35 arm for the top layer 11
36 arm for the top layer 21
37 bearing surface of the arm 36
38 bearing surface of the arm 35
41 spacer.

What is claimed is:

1. A sheetlike composite element comprising a core element, the core element having opposing spaced outer surfaces, an outer layer which is connected to one of the opposing spaced outer surfaces of the core element, another outer layer which is connected to the other opposing spaced outer surface of the core element, and a profile for the reinforcement of the sheetlike composite element, the profile contacting said core element, the profile having two essentially parallel arms, which act as bearing surfaces selected from the group consisting of inner bearing surfaces and outer bearing surfaces, for the two outer layers and whose geometric spacing is at least as great as the distance between the two outer layers, having a further bearing surface for non-outer, narrow side of the core element, which further bearing surface is arranged between planes defined by said parallel arms bearing surfaces, and having at least one continuous connecting crosspiece between said parallel arms, and forming with arms a shaped arrangement selected from at least one member of the group consisting of an essentially U-, Z- and H-shaped arrangement in cross-section in the latitudinal direction of the profile, and said further bearing surface having outer extensions in portion which contact said core element, the further bearing surface for said narrow side of the core element is separated from said at least one connecting crosspiece by at least one spacer, which extends between said at least one connecting crosspiece and said further bearing surface, said at least one spacer being connected to said further bearing surface so as to provide said outer extensions of said further bearing surface, and an interspace selected from the group consisting of a continuous interspace and an interrupted interspaces extending in the longitudinal direction of the profile being present between the parallel arms bearing surfaces for the outer layers and the planes defined by the parallel arms bearing surfaces and outer borders of the further bearing surface for the core element, said interspace being in communication with at least one channel which extends in the longitudinal direction of the profile.

2. The sheetlike composite element according to claim 1, wherein slots or grooves are made in said further bearing surface or the parallel arms bearing surfaces for the core, respectively.

3. The sheetlike composite element according to claim 2, wherein the slots or grooves extend in the longitudinal direction of the profile.

4. The sheetlike composite element according to claim 3, wherein the parallel arms bearing surfaces for the outer layers are on the sides of the parallel arms that are remote from the continuous connecting crosspiece.

5. The sheetlike composite element according to claim 1, wherein the core element is bonded to one of the outer layers, and at least one of the bond surfaces is provided with slots or grooves which are essentially parallel to one another and whose direction forms an angle with the longitudinal direction of the profile.

6. The sheetlike composite element according to claim 1, wherein the parallel arms bearing surfaces for the outer layers are on the sides of the parallel arms that are remote from the continuous connecting crosspiece.

7. A sheetlike composite element comprising a core element, the core element having opposed spaced outer surfaces, an outer layer which is connected to one of the opposing spaced outer surfaces of the core element, another outer layer which is connected to the other opposing spaced outer surface of the core element, and a profile for the bordering of the sheetlike composite element, the profile contacting said core element, the profile having two essentially parallel arms, which act as bearing surfaces selected from the group consisting of inner bearing surfaces and outer bearing surfaces, for the two outer layers and whose geometric spacing is at least as great as the distance between the two outer layers, having a further bearing surface for non-outer, narrow side of the core element, which further bearing surface is arranged between planes defined by said parallel arms bearing surfaces, and having at least one continuous connecting crosspiece between said parallel arms, and forming with arms a shaped arrangement selected from at least one member of the group of an essentially U-, Z- and H-shaped arrangement in cross-section in the latitudinal direction of the profile, and said further bearing surface having outer extensions in portion which contact said core element, the further bearing surface for said narrow side of the core element is separated from said at least one connecting crosspiece by at least one spacer, which extends between said at least one connecting crosspiece and said further bearing surface, said at least one spacer being connected to said further bearing surface so as to provide said outer extensions of said further bearing surface, and an interspace selected from the group consisting of a continuous interspace and an interrupted interspace, extending in the longitudinal direction of the profile being present between the parallel arms bearing surfaces for the outer layers and the planes defined by the parallel arms bearing surfaces for the outer layers and the planes defined by the parallel arms bearing surfaces and outer borders of the further bearing surface for the core element, said interspace being in communication with at least one channel which extends in the longitudinal direction of the profile.

8. The sheetlike composite element according to claim 7, wherein the profile is a border profile and the parallel arms bearing surfaces for the outer layers are on the sides of the parallel arms that face the continuous connecting crosspiece.

9. The sheetlike composite element according to claim 7, wherein the profile is a border profile and one of the parallel arms bearing surfaces for the outer layers is on that side of one parallel arm that faces the continuous connecting crosspiece and the other is on that side of the other parallel arm that is remote from the continuous connecting crosspiece.

10. The sheetlike composite element according to claim 7, wherein the profile is a border profile and outside of the further bearing surface and the parallel arms bearing surfaces for the core element and outer layer or layers, respectively, there is at least one spacing element or bearing element or a holding element suitable for receiving the at least one spacing element or bearing element.

11. The sheetlike composite element according to claim 10, wherein the profile is a border profile and the holding element is at least one groove in the profile in the longitudinal direction of the profile.

12. The sheetlike composite element according to claim 7, wherein the profile is a border profile and, as a border finish, at least one of the outer layers is bent around a correspondingly designed edge of the border profile.

13. The sheetlike composite element according to claim 7, wherein the profile is a border profile and, as a border finish, at least one of the outer layers is bent around a correspondingly designed edge of the border profile.

14. The sheetlike composite element according to claim 7, wherein the profile is a border profile and the bearing surfaces for the outer layers are on the sides of the parallel arms that face the continuous connecting crosspiece.

15. The sheetlike composite element according to claim 7 wherein the profile is a border profile and one of the bearing surfaces for the outer layers is on that side of one parallel arm that faces the continuous connecting crosspiece and the other is on that side of the other parallel arm that is remote from the continuous connecting crosspiece.

16. The sheetlike composite element according to claim 7, wherein the profile is a border profile outside of the at least one further bearing surface and the parallel arms bearing surfaces for the one or two core elements and outer layer or layers, respectively, there is at least one spacing element or bearing element or a holding element suitable for receiving the at least one spacing element or bearing element.

17. A sheetlike composite element comprising two core elements, each core element having opposed spaced outer surfaces, an outer layer which is connected to one of the opposing spaced outer surfaces of each of the two core elements, another outer layer which is connected to the other opposing spaced outer surface of each of the two core elements, and a profile for the reinforcement of the sheetlike composite element, said profile having two opposed ends, the opposed ends of the profile contacting said two core elements, the profile having two essentially parallel arms, which act as bearing surfaces selected from the group consisting of inner bearing surfaces and outer bearing surfaces, for the two outer layers and whose geometric spacing is at least as great as the distance between the two outer layers, having two further bearing surfaces, each for a non-outer, narrow side of each of the core elements, which two further bearing surfaces are arranged between planes defined by said parallel arms bearing surfaces, and each further bearing surface having at least one continuous connecting crosspiece between said parallel arms, and forming with arms a shaped arrangement selected from at least one member of the group of an essentially U-, Z- and H-shaped arrangement in cross-section in the latitudinal direction of the profile, and each of said further bearing surfaces having outer extensions in portion which contact one of said core elements, each of the further bearing surfaces for said narrow side of one of the core elements is separated from said at least one connecting crosspiece by at least one spacer, which extends between said at least one connecting crosspiece and one of the said further bearing surfaces, said at least one spacer being connected to the one of the further bearing surfaces so as to provide said outer extensions of the one of the further bearing surfaces, and, on each opposed end of the profile, an interspace selected from the group consisting of a continuous interspace and an interrupted interspace, extending in the longitudinal direction of the profile being present between the parallel arms bearing surfaces for the outer layers and the planes defined by the parallel arms bearing surfaces for the outer layers and the planes defined by the parallel arms bearing surfaces and outer borders of each of the further bearing surfaces for each of the core elements, each of said interspaces being in communication with at least one channel which extends in the longitudinal direction of the profile.

18. A sheetlike composite element comprising two core elements, each core element having opposed spaced outer surfaces, an outer layer which is connected to one of the opposing spaced outer surfaces of each of the two core elements, another outer layer which is connected to the other opposing spaced outer surface of each the two core elements, and a profile for the bordering of the sheetlike composite element, said profile having two opposed ends, the opposed ends of the profile contacting said two core elements, the profile having two essentially parallel arms, which act as bearing surfaces selected from the group consisting of inner bearing surfaces and outer bearing surfaces, for the two outer layers and whose geometric spacing is at least as great as the distance between the two outer layers, having two further bearing surfaces, each for a non-outer, narrow side of each of the core elements, which two further bearing surfaces are arranged between planes defined by said parallel arms bearing surfaces, and each further bearing surface having at least one continuous connecting crosspiece between said parallel arms, and forming with arms a shaped arrangement selected from at least one member of the group of an essentially U-, Z- and H-shaped arrangement in cross-section in the latitudinal direction of the profile, and each of said further bearing surfaces having outer extensions in portion which contact one of said core elements, each of the further bearing surfaces for said narrow side of one of the core elements is separated from said at least one connecting crosspiece by at least one spacer, which extends between said at least one connecting crosspiece and the one of the further bearing surfaces, said at least one spacer being connected to the one of the further bearing surfaces so as to provide said outer extensions of the one of the further bearing surfaces, and, on each opposed end of the profile, an interspace selected from the group consisting of a continuous interspace and an interrupted interspace, extending in the longitudinal direction of the profile being present between the parallel arms bearing surfaces for the outer layers and the planes defined by the parallel arms bearing surfaces for the outer layers and the planes defined by the parallel arms bearing surfaces and outer borders of each of the further bearing surfaces for each of the core elements, each of said interspaces being in communication with at least one channel which extends in the longitudinal direction of the profile.

* * * * *